United States Patent
Chi

(10) Patent No.: US 7,962,026 B2
(45) Date of Patent: Jun. 14, 2011

(54) DISCRETE AUTOMATIC FOCUSING AND ERROR CORRECTING METHOD

(75) Inventor: Yong Seok Chi, Suwon-si (KR)

(73) Assignee: LG Electronics Inc., Seoul (KR)

( * ) Notice: Subject to any disclaimer, the term of this patent is extended or adjusted under 35 U.S.C. 154(b) by 835 days.

(21) Appl. No.: 11/835,175

(22) Filed: Aug. 7, 2007

(65) Prior Publication Data

US 2008/0037974 A1 Feb. 14, 2008

(30) Foreign Application Priority Data

Aug. 8, 2006 (KR) .................. 10-2006-0074549
Aug. 8, 2006 (KR) .................. 10-2006-0074550

(51) Int. Cl.
*G03B 17/00* (2006.01)
(52) U.S. Cl. ............... 396/77; 348/345; 250/201.7
(58) Field of Classification Search ............ 396/79, 396/77; 348/345; 250/201.7
See application file for complete search history.

(56) References Cited

U.S. PATENT DOCUMENTS

| | | | |
|---|---|---|---|
| 4,473,743 A | | 9/1984 | Ishikawa |
| 5,249,058 A | * | 9/1993 | Murata et al. ............ 348/354 |
| 6,430,368 B1 | * | 8/2002 | Hata ........................ 396/79 |
| 2001/0035910 A1 | | 11/2001 | Yukawa et al. |
| 2003/0048372 A1 | | 3/2003 | Yasuda |
| 2003/0063211 A1 | | 4/2003 | Wantnabe et al. |
| 2003/0063212 A1 | * | 4/2003 | Watanabe et al. ......... 348/349 |
| 2003/0117517 A1 | * | 6/2003 | Ogino ...................... 348/356 |
| 2008/0124068 A1 | * | 5/2008 | Kwon et al. ............. 396/127 |

FOREIGN PATENT DOCUMENTS

| | | |
|---|---|---|
| EP | 0 341 692 A2 | 11/1989 |
| EP | 1 821 128 A1 | 8/2007 |
| WO | WO-2006/054562 A1 | 5/2006 |

* cited by examiner

*Primary Examiner* — W. B. Perkey
*Assistant Examiner* — Fang-Chi Chang
(74) *Attorney, Agent, or Firm* — Birch, Stewart, Kolasch & Birch, LLP

(57) ABSTRACT

Provided are a discrete AF control method and an error correcting method of a camera module using a diffraction device. In the method, a focus is moved to a (the number of all positions/m)-th position, and a focusing value at a start position is compared with that at the (the number of all positions/m)-th position. A focus is moved by two positions in a first direction according to the comparison result. If a position having a maximum focusing value is passed, a focus is moved by one position in a direction opposite to the first direction and a location (corresponding to an n-th position) is stored. Focusing values of the n-th position, an (n−1)-th position, and an (n−2)-th position are compared with one another to determine a maximum focus location, m being an integer equal to or greater than 2.

4 Claims, 11 Drawing Sheets

DISCRETE AUTOMATIC FOCUSING AND ERROR CORRECTING METHOD

CROSS-REFERENCE TO RELATED APPLICATIONS

The present application claims priority under 35 U.S.C. 119 and 35 U.S.C. 365 to Korean Patent Application No. 10-2006-0074549 (filed on Aug. 8, 2006), and Korean Patent Application No. 10-2006-0074550 (filed on Aug. 8, 2006) which are hereby incorporated by reference in its entirety.

BACKGROUND

The present disclosure relates to a method for controlling a camera module, and more particularly, to a method for controlling discrete automatic focusing of a camera module using a diffraction device, and a method for correcting a discrete automatic focusing error.

In a related art lens focusing method, focusing is performed by moving a lens. The related art lens focusing method is classified into a variable focus liquid lens driving method using hydraulic pressure, a piezoelectric method using a piezoelectric effect, a voice coil motor (VCM) method using the principle of Lorenz force, a smooth impact drive mechanism (SIDM) actuator method using a field effect transistor, and a Helimorph method depending on a lens driving method.

As cellular phones and digital cameras are miniaturized and become slim, miniaturization and slimness in the size and volume of a camera module are required. Making a slim camera module having a related art driving method for moving a lens such as a stepping motor method, a VCM method, and a piezoelectric method has a limitation.

To resolve a limitation in a method of controlling a focus distance by moving the position of a lens, a method of fixing the position of a lens and controlling the curvature of a reflective type curvature variable diffraction device has been proposed recently. In this method, focusing is performed according to a so-called continuous automatic focusing method of sequentially changing the curvature of a curvature variable diffraction device within a focus variable range.

Since a related art automatic focusing method uses the same focusing method regardless of where a focusing position is located, it is not suitable for a recent apparatus requiring a complicated and fast response.

Therefore, a focusing method that can perform automatic focusing through a faster and simpler operation is required.

SUMMARY

Embodiments provide a method for controlling a focus distance of a lens in a faster and more efficient way using a curvature variable reflective type diffraction device.

Embodiments also provide a method for efficiently correcting a focusing error of a lens using a curvature variable reflective type diffraction device.

Embodiments also provide a focusing method that can uniformly perform focusing over an entire frame by applying a division focusing method to a discrete automatic focusing method.

Embodiments also provide a division focusing method that is faster and has a small operation load by improving a related art division focusing method requiring more number of operations.

In one embodiment, a discrete automatic focusing method includes: moving a focus to a (the number of all positions/m)-th position; comparing a focusing value at a start position with that at the (the number of all positions/m)-th position; moving a focus by two positions in a first direction according to the comparison result; if a position having a maximum focusing value is passed, moving a focus by one position in a direction opposite to the first direction and storing a location (corresponding to an n-th position); and comparing focusing values of the n-th position, an (n−1)-th position, and an (n−2)-th position to determine a maximum focus location, m being an integer equal to or greater than 2.

In another embodiment, a discrete automatic focusing method includes: moving a focus to a (the number of all positions/m)-th position; comparing a focusing value at a start position with that at the (the number of all positions/m)-th position; moving a focus by two positions in a first direction according to the comparison result; if a position having a maximum focusing value is passed, moving a focus by one position in a direction opposite to the first direction and storing a location (corresponding to an n-th position); and repeating a movement between focus locations of the n-th position, an (n−1)-th position, and an (n−2)-th position, m being an integer equal to or greater than 2.

In further another embodiment, a discrete automatic focusing method includes: determining division regions of an image; filtering the division regions of the image using a band pass filter; performing discrete automatic focusing on the determined division regions on the basis of focusing values of the filtered image; storing the focused division regions in a buffer; and integrating division regions stored in the buffer.

In still further another embodiment, a discrete division automatic focusing apparatus includes: a lens module including a curvature variable diffraction device focusing on an image, and converting the image into image signals; a device control unit for controlling the diffraction device; a window setting unit for setting a portion of image signals to be filtered, the image signals being received from a band pass filter; the band pass filter for receiving image signals from the lens module to filter a portion of the image signals according to a set value of the window setting unit; a system control unit for operating focusing values of an image that has passed through the band pass filter to control the device control unit to perform discrete automatic focusing, and integrating images; and a buffer for storing image signals focused by the system control unit.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
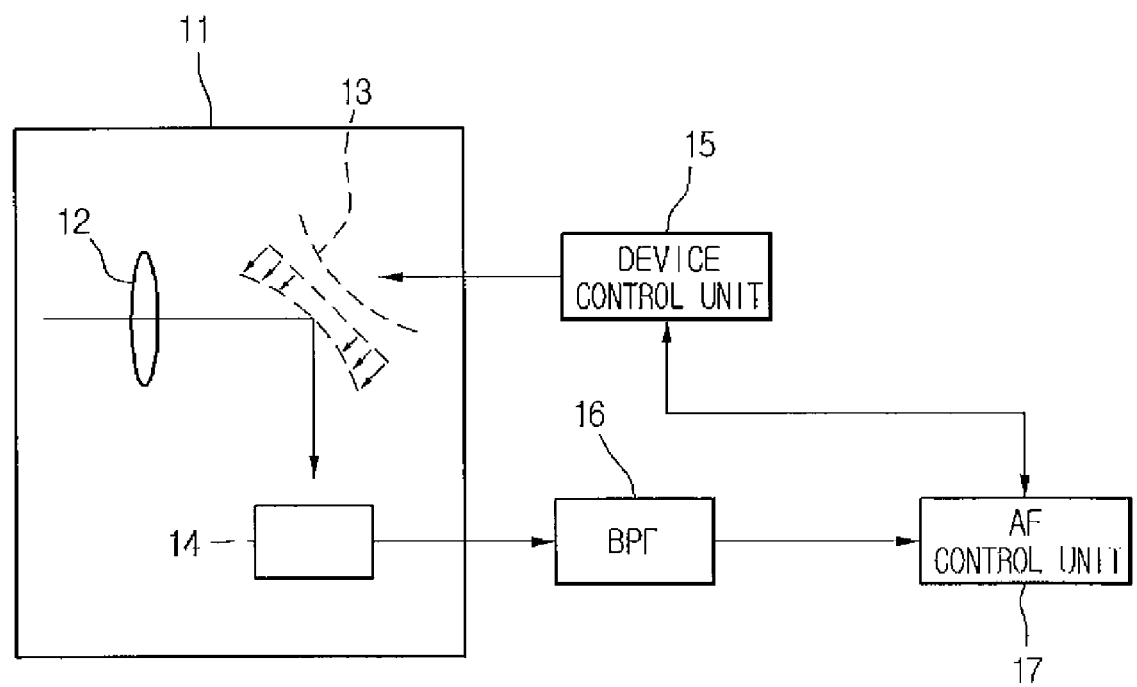
FIG. 1 is a block diagram of a system performing an automatic focusing control method using a curvature variable reflective type diffraction device according to an embodiment.

FIG. 1 is a block diagram of a system performing an automatic focusing control method using a curvature variable reflective type diffraction device according to an embodiment.

A lens module 11 includes a fixed lens 12 for condensing incident light, a reflective type diffraction device 13 for diffracting light that has passed through the fixed lens 12, and a sensor 14 for converting light diffracted by the reflective type diffraction device 13 into image signals. The reflective type diffraction device 13 can diffract incident light and variably control curvature. The effective focal distance of a lens module 11 can be substantially changed by changing the curvature of the reflective type diffraction device 13.

Image signals obtained by the lens module 11 pass through a band pass filter 16 and are delivered to an automatic focusing (AF) control unit 17. The AF control unit 17 calculates AF values of image signals, that is, cut-off frequency values from image signals that have passed through the band pass filter 16.

Depending on embodiments, a pre-process device can be further provided. The pre-process device performs a pre-process of quantizing an image signal and removing a noise before the image signal that has passed through the sensor 14 is delivered to the band pass filter 16.

The AF control unit 17 determines to what extent an effective focal distance is to be changed on the basis of a calculated cut-off frequency value and delivers the same to a device control unit 15. The curvature radius of the reflective type diffraction device 13 is controlled by a signal applied from the device control unit 15, which changes curvature in response to a signal from the AF control unit 17.

A discrete AF control method will be described in detail according to an embodiment with reference to FIGS. 2 and 3.

Figure 2:
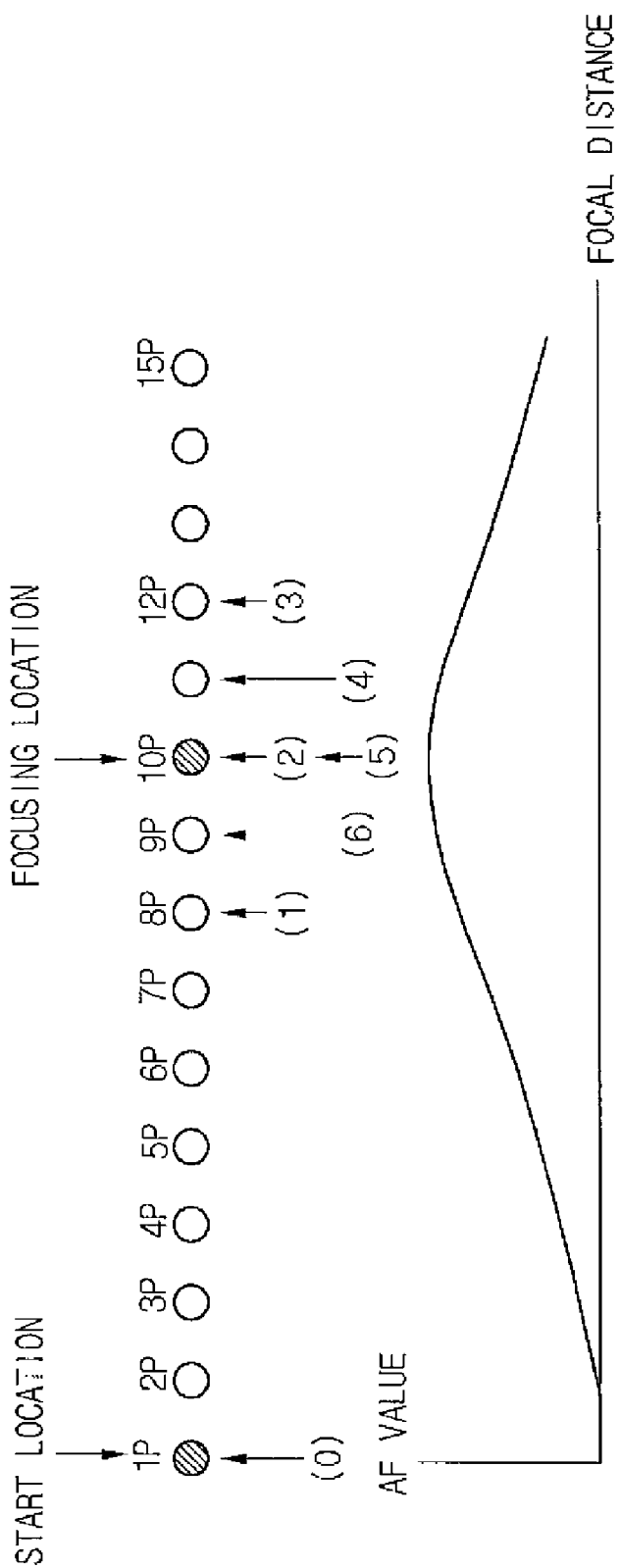
FIG. 2 is a view explaining a discrete automatic focusing control method according to an embodiment.
Figure 3:
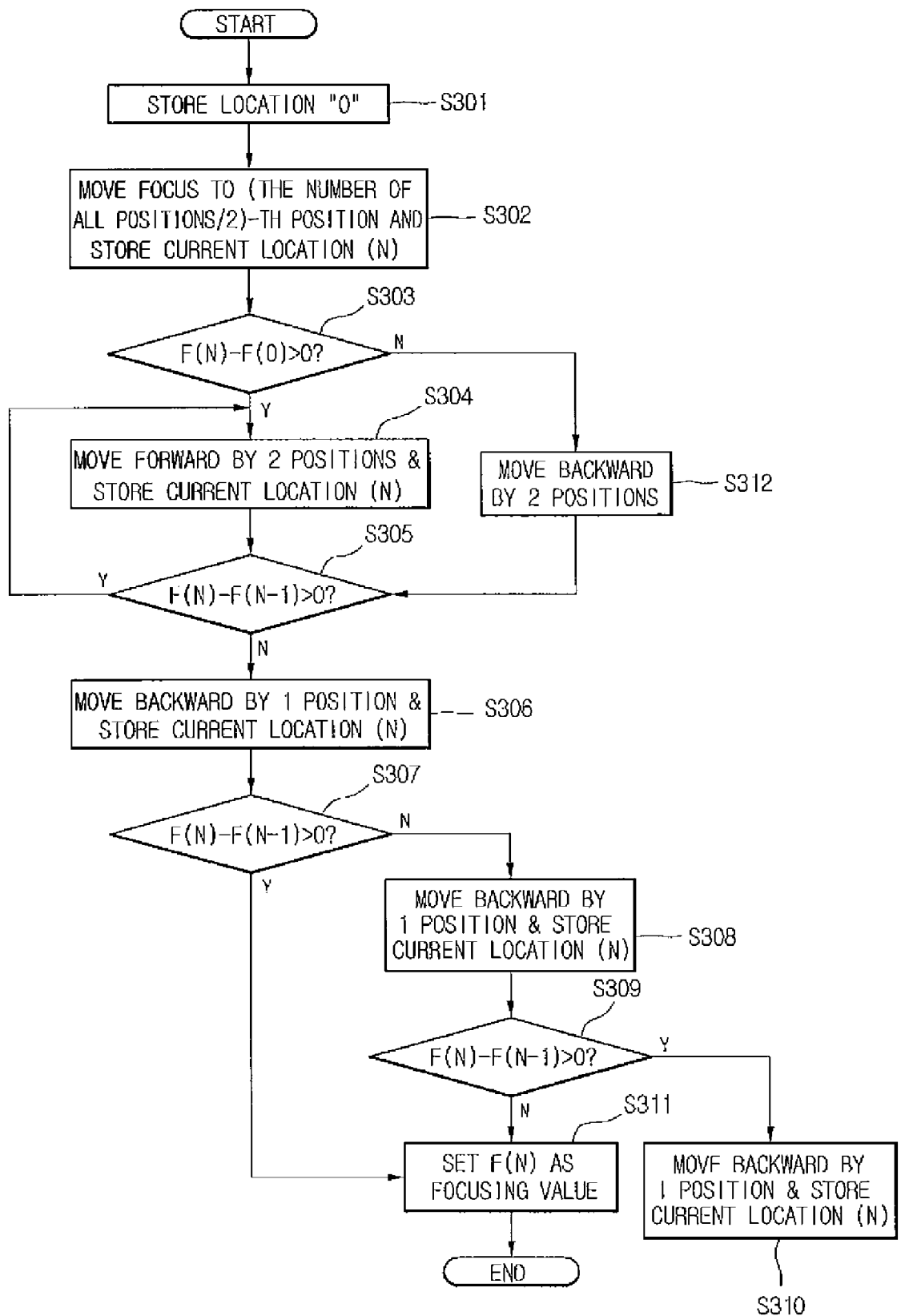
FIG. 3 is a flowchart of a discrete automatic focusing control method according to an embodiment.

FIG. 2 is a view explaining a discrete automatic focusing control method according to an embodiment, and FIG. 3 is a flowchart of a discrete automatic focusing control method according to an embodiment.

In an embodiment of FIG. 2, it is assumed that focal distances that can be used by the lens module 11 are distributed into fifteen positions. The number of positions distributing the focal distances are for explanation and may change depending on embodiments. The number of positions can increase or decrease depending on the range in which the focal distances of the lens module 11 can vary and device performance.

Also, in the embodiment of FIG. 2, it is assumed that a focusing location, that is, an object focal distance that a user desires to find through focusing is located at 10P. Therefore, an AF value at 10P will be maximized. AF values form a peak around a point of 10P.

Referring to FIGS. 2 and 3, when AF starts, the curvature of the diffraction device 13 is set such that a current location is set to a start location (location (0) in FIG. 2), that is, a start point location is set to be a point of 1P, so that the start point location is stored (S301). Also, an AF value at 1P is calculated. The start point location may change depending on an embodiment.

After that, the current location moves to a location of a (the number of all positions/2)-th focal distance, i.e., a (15/2)=7.5-th focal distance (S302). Here, 7.5 is rounded off to 8, and the current location moves to 8P (location (1)). A method of converting the number of all positions/2 into an integer may change depending on an embodiment. That is, a decimal place can be ignored or rounded off. After that, an AF value is calculated at 8P.

Next, AF values at 1P and 8P are compared with each other to judge which value is greater. When the AF value at 8P is greater than that at 1P, a focal distance moves in a direction along which a focal distance increases, that is, to the right by 2 positions in FIG. 2. That is, the current location moves to 10P (location (6) in FIG. 2), and the current location of 10P is stored (S304). For convenience, a direction along which a focal distance is distant away from the lens is described by a forward direction, and a direction along which a focal distance gets close to the lens is described by a backward direction hereinafter.

In an operation S303, AF values at 1P and 8P have been compared with each other. When the AF value at 1P is greater than that at 8P, a direction immediately changes and a current location moves in the backward direction by 2 positions (S312). In this case, "backward direction" will change into "forward direction", and "forward direction" will change into "backward direction" in operations after an operation S306 of FIG. 3.

That is, assuming that a direction determined by comparison of AF value at 1P with that at 8P after a current location moves to 8P is a first direction, "forward direction" corresponds to the first direction, and "backward direction" corresponds to a second direction opposite to the first direction in operations below the operation S306.

After that, which AF value of AF values at 8P and 10P is greater is judged (S305). Since it is expected that an AF value at 10P is greater, a current location moves by 2 positions. That is, the current location moves to a point of 12P (location (1) in FIG. 2), and the current location is stored (S304).

Next, an AF value (F(N)) at the current location of 12P is compared with an AF value (F(N-1)) at a previous location of 10 p. The AF value at 12P is smaller than that at 10P. This means that the location having a maximum AF value has been passed. Here, since a current location has passed by the maximum AF value while moving forward by 2 positions, the location having the maximum AF value is one of 9P, 10P, and 11P.

To check which location of 9P, 10P, and 11P is a focusing location, a focal distance movement direction is changed, a current location moves backward by 1 position to move to 11P (location (4)), and the location of 11 p is stored (S306).

After that, AF values at 11P and 10P are compared with each other (S307). When the AF value at 11P is greater than that at 10P, the AF value (F(11)) at 11 p is determined as a final AF value.

When the AF value at 10P is greater than that at 11P, a current location moves backward further by 1 position (location (5)) and the current location is stored (S308), and the AF values at 10P and 9P are compared with each other (S309).

When the AF value at 10P is greater than that at 9P, the AF value (F(10)) at 10P is determined as a final AF value. When the AF value at 9P is greater than that at 10P, a current location moves backward further by 1 position, the current location is stored (S310), and an AF value (F(9)) at 9P (location (6)) is determined as a final AF value.

Since it is assumed that 10P is a focal distance having a maximum AF value in an embodiment, an AF value (F(10)) at 10P is determined as a final focusing value.

Referring to FIG. 2, which illustrates an embodiment, a focal distance moves in the order of (0)→(1)→(2)→(3)→(4)→(5)→(6). That is, total six times of focal distance movements and focusing operations are performed.

In a discrete focusing method according to one embodiment, the number of required focusing operations is smaller than that of a related art continuous focusing method of sequentially performing focusing from 1P to 11P to compare AF values with one another. Accordingly, a time is consumed less and an AF operation can be swiftly performed.

Total ten times of focal distance movements and focusing operations are performed to find out a location having a maximum AF value according to a related art method, but only six times of focal distance movements and focusing operations are required according to an embodiment. Assuming that a time of 1/30 sec is consumed in performing one time of a focal distance movement and a focusing operation, a focusing time required by the related art method is 1/30 sec×10=0.67 sec, and a focusing time according to an embodiment is 1/30×5 sec=0.2 sec.

Such a difference increases much as the number of focal distance control positions increases.

In the case where there is almost no difference between AF values at 9P, 10P, and 11P in the embodiment of FIGS. 2 and 3, an error may be generated to AF measurement or operations, for example, a cut-off frequency value generated while signals pass through a band pass filter. In this case, neither of 9P, 10P, and 11P is determined as a focal distance, and an effective focal distance is repeated between 9P, 10P, and 11P to obtain a better focusing effect.

Figure 4:
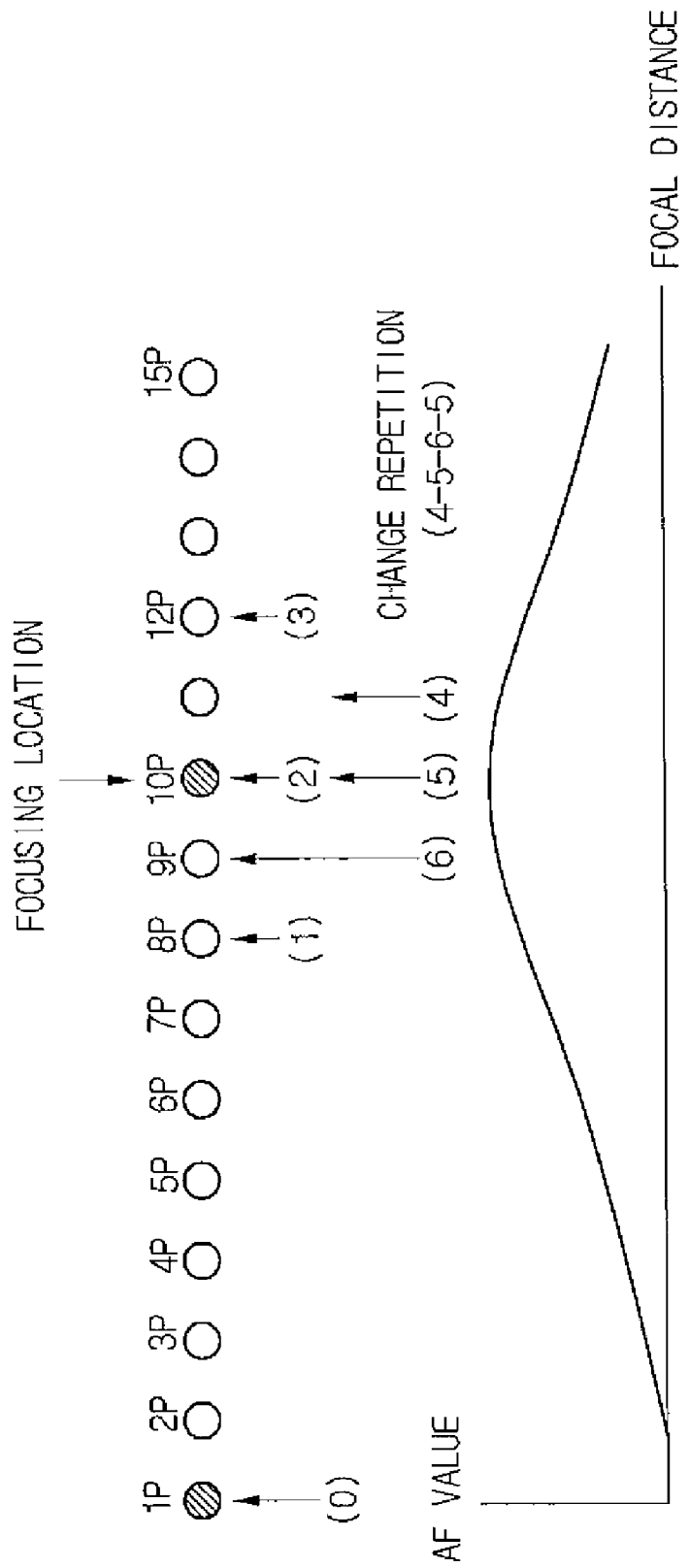
FIG. 4 is a view explaining a focusing error correcting control method according to an embodiment.
Figure 5:
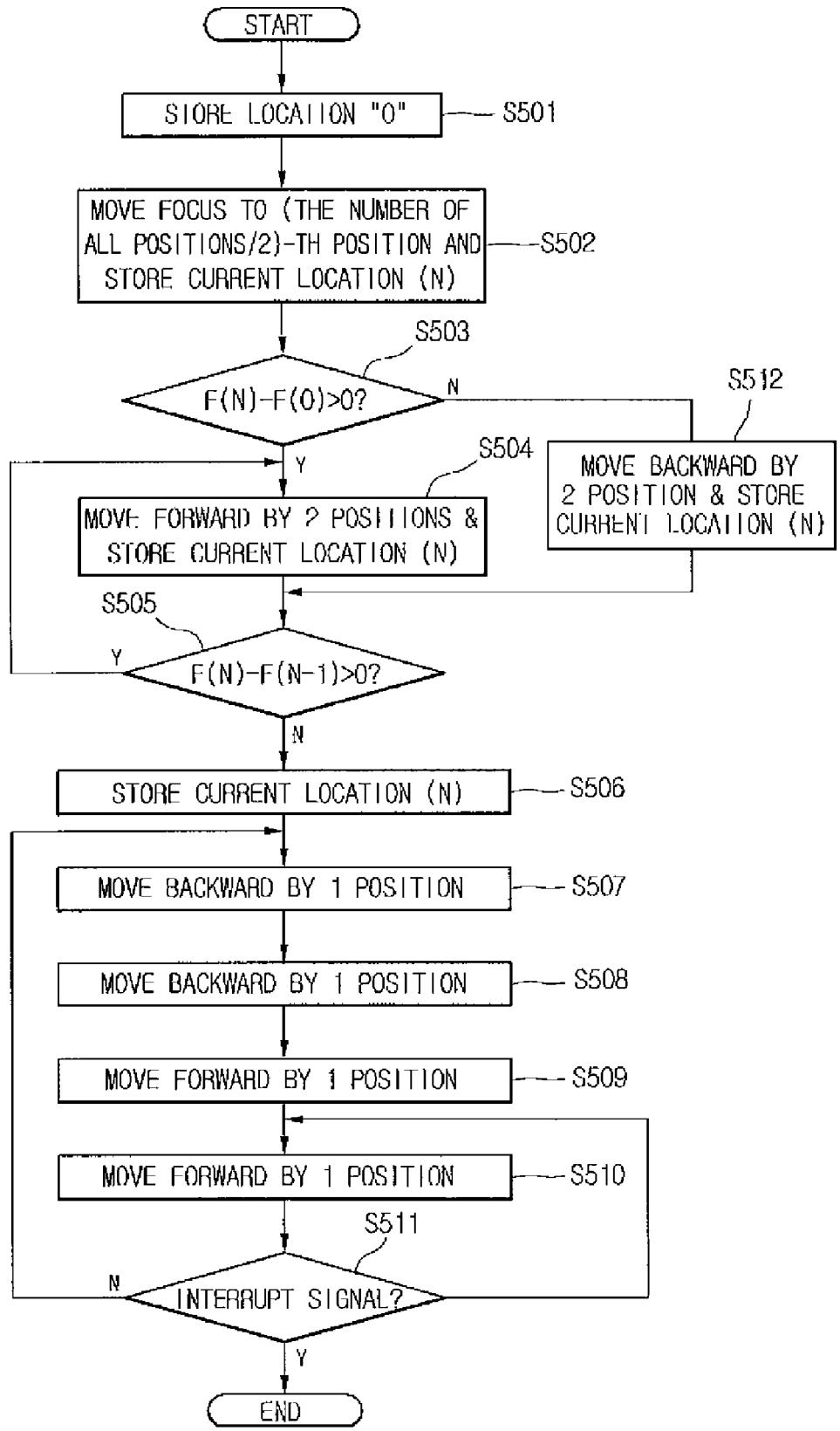
FIG. 5 is a flowchart of a focusing error correcting control method according to an embodiment.

FIG. 4 is a view explaining a focusing error correcting control method according to an embodiment, and FIG. 5 is a flowchart of a focusing error correcting control method according to an embodiment.

As in FIGS. 2 and 3, it is assumed that there are fifteen focal distances. Since operations up to an operation S506A of moving a current location up to 12P (location (1)), comparing AF values at 12P and 10P with each other, moving backward the current location by 1 position, and storing 11P as a current location are the same as those in FIGS. 2 and 5, descriptions thereof are omitted.

An object focusing location is one of 9P, 10P, and 11P. In the case where AF values at 9P, 10P, and 11P are nearly similar to one another, and so it is difficult to determine which value is greater, or an error is generated during an operation, focusing is performed through superposition by constantly moving a focal distance between 9P, 10P, and 11P without determination of a focusing location.

Referring to FIG. 5, in the case where an error is generated to an operation or measurement in an operation S506, a loop of moving backward two times by 1 position and moving forward two times by 1 position is repeatedly performed, and the loop is constantly performed until an interrupt signal is input (S511).

That is, referring to FIG. 5, which illustrates an embodiment, a focal distance moves in the order of (0)→(1)→(6)→(1)→(4)→(5)→(6)→(5)→(4)→(5)→(6)→(5)→(4)→(5)→(6) .... That is, a loop is constantly repeated in the order of "(5)→(4)→(5)→(6)" at 9P, 10P, and 11P.

An interval for a position changing velocity, i.e., a focal distance control velocity can change such that focusing can be realized through superposition depending on a display device or device performance.

Figure 6:
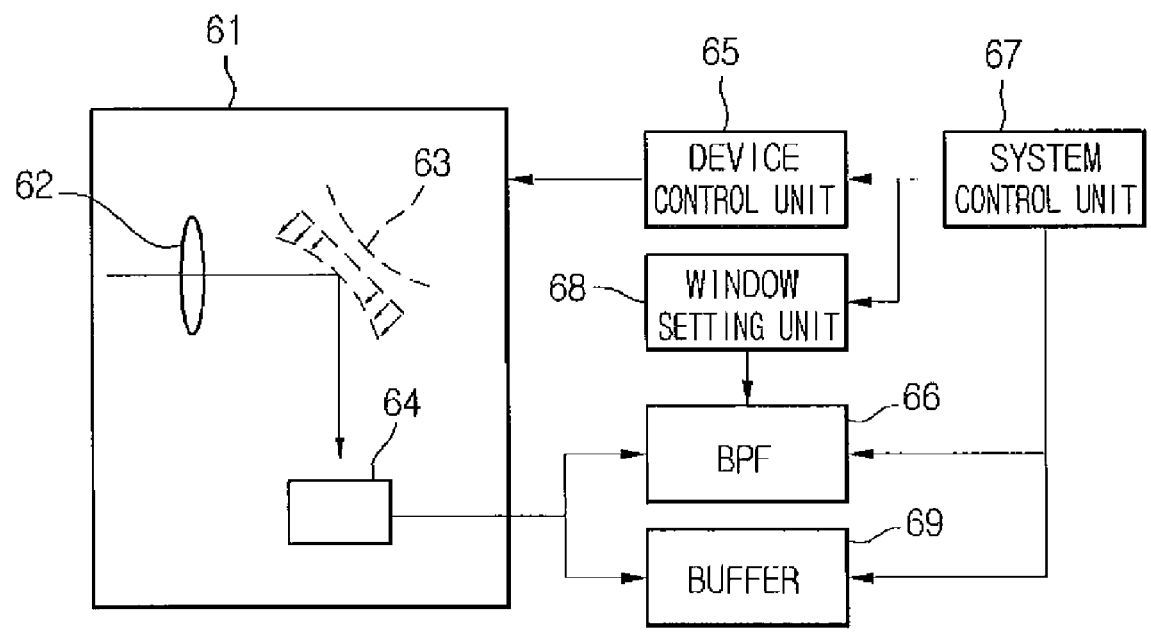
FIG. 6 is a block diagram of a division automatic focusing apparatus using a curvature variable reflective type diffraction device according to an embodiment.

FIG. 6 is a block diagram of a division automatic focusing apparatus using a curvature variable reflective type diffraction device according to an embodiment.

A lens module 61 includes a fixed lens 62 for condensing incident light, a reflective type diffraction device 63 for diffracting light that has passed through the fixed lens 62, and a sensor 64 for converting light diffracted by the reflective type diffraction device 63 into image signals. The reflective type diffraction device 63 can diffract incident light and variably control curvature. The effective focal distance of a lens module 11 can be substantially changed by changing the curvature of the reflective type diffraction device 63.

Image signals obtained by the lens module 11 pass through a band pass filter 66 and are delivered to a system control unit 67. The system control unit 67 calculates AF values of image signals, that is, cut-off frequency values of image signals that have passed through the band pass filter 66.

Depending on embodiments, a pre-process device can be further provided. The pre-process device performs a pre-process of quantizing an image signal and removing a noise before the image signal that has passed through the sensor 64 is delivered to the band pass filter 66.

A window setting unit 68 sets which portion of image data delivered to the band pass filter 66 from the lens module 61 is to be filtered. That is, regarding image signals delivered to the band pass filter 66, all of signals corresponding to an entire one frame are not filtered, but only a portion of signals specified by the window setting unit 68 is filtered. The system control unit 67 calculates a cut-off frequency from image data obtained through filtering.

The system control unit 67 determines an effective focal distance to be changed on the basis of the calculated cut-off frequency value, and delivers the same to a device control unit 65. The curvature of a reflective type diffraction device 63 of the lens module 61 changes in response to a signal applied from the device control unit 65. The device control unit 65 changes the curvature in response to a signal received from the system control unit 67, thereby changing the focal distance of the lens module 61.

The division AF method according to an embodiment divides an image of one frame into a plurality of windows or division regions using the discrete AF method of FIGS. 2 and 3, performs band pass filtering for each divided window to operate AF values and perform focusing on the basis of filtered signals.

FIGS. 7A to 7G and 8A to 8F are views explaining a division automatic focusing method according to an embodiment. The division automatic focusing method can be performed by the division AF apparatus of FIG. 6.

Referring to FIG. 6, the window setting unit 68 transmits data regarding which region is to be filtered in image data input to the band pass filter 66. The band pass filter 66 performs filtering on only a relevant window or division region according to data received from the window setting unit 68. The system control unit 67 performs focusing on a filtered image signal, and the focused image signal is stored in a buffer 69.

One image frame can be divided into windows or division regions of various shapes and various numbers as illustrated in FIGS. 7A to 7G.

Figure 7A:
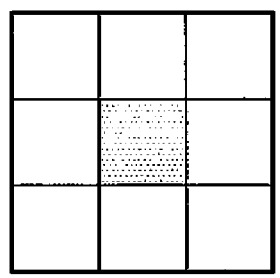
FIGS. 7A to 7G and 8A to 8F are views explaining a division automatic focusing method according to an embodiment.
Figure 7B:
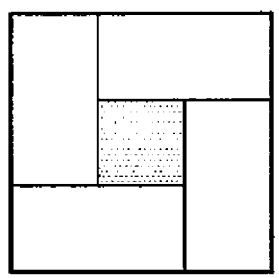
Figure 7C:
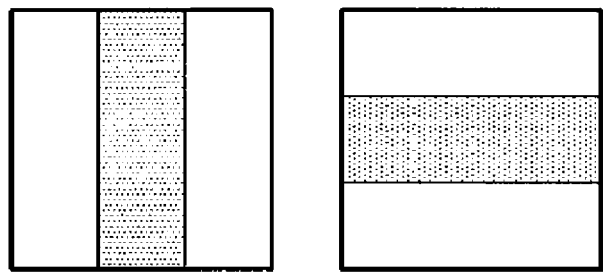
Figure 7D:
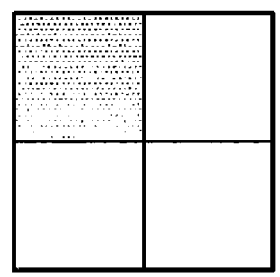
Figure 7E:
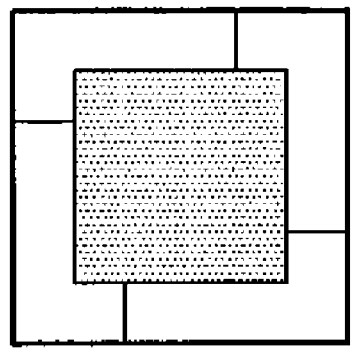
Figure 7F:
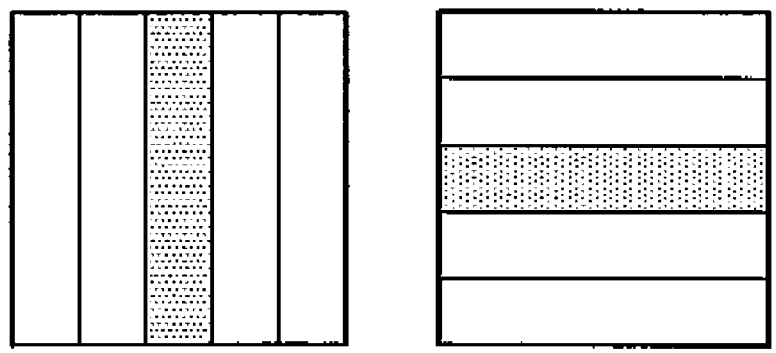
Figure 7G:
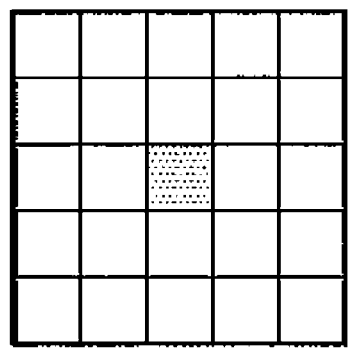

FIG. 7A illustrates a method of dividing an image frame into nine small squares, and image data of FIG. 7B is divided into windows including a central small square and four rectangles around the central square. FIG. 7C illustrates a method of dividing an image frame into three rectangles, and FIG. 7D illustrates a method of dividing an image frame into four quadrangles. FIG. 7E illustrates a method of dividing an image frame into a central large square and four "⌐"-shaped figures around the central square, FIG. 7F illustrates a method of dividing an image frame into five narrow width rectangles, and FIG. 7G illustrates a method of dividing an image frame into twenty five small quadrangles.

A division focusing method is described using the dividing method of FIG. 7B with reference to FIGS. 8A to 8F.

Regions divided into five windows are filtered by the band pass filter 66 of FIG. 6 and stored in the buffer 69 for each region as illustrated in FIGS. 8A to 8E. The system control unit 67 calculates an AF value for each region on the basis of filtered values, and performs focusing using the method of FIGS. 3 and 4.

Figure 8A:
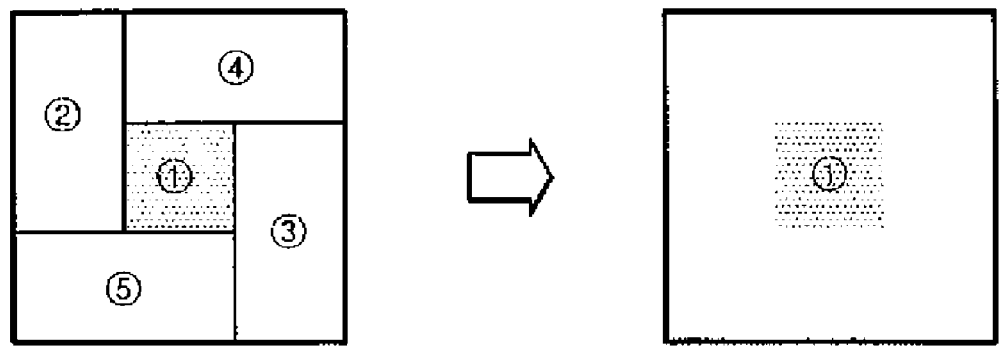
Figure 8B:
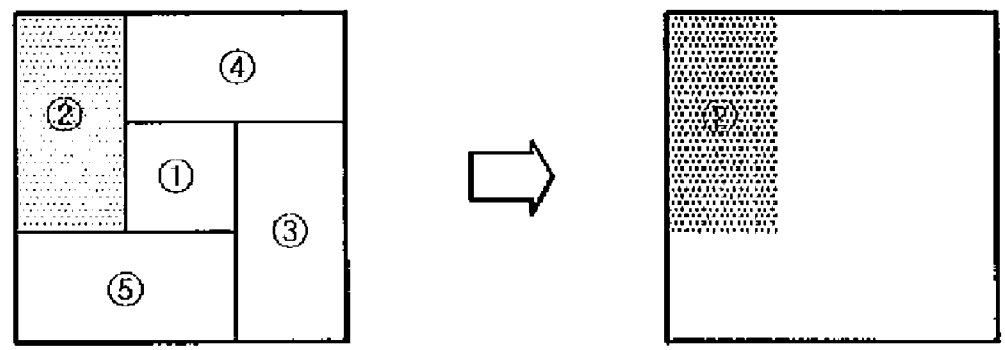
Figure 8C:
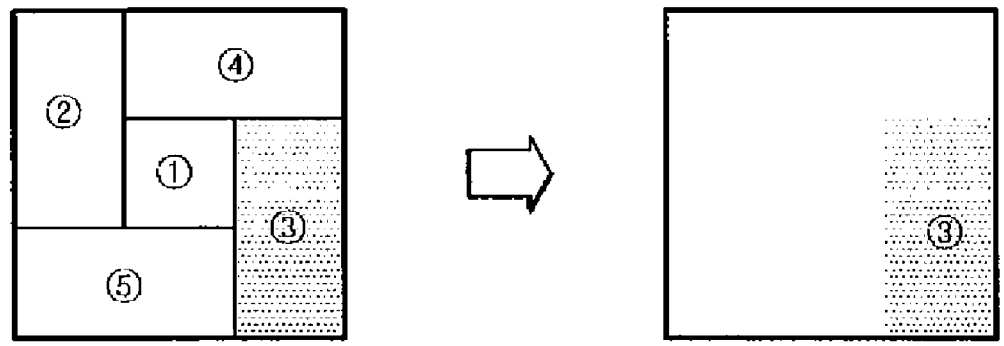
Figure 8D:
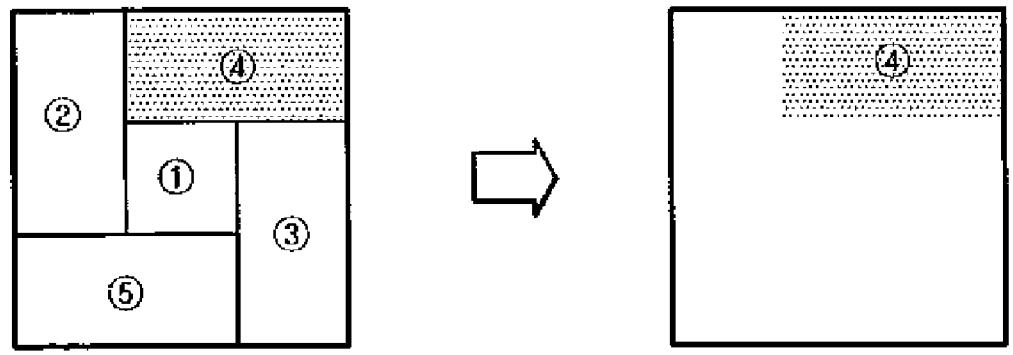
Figure 8E:
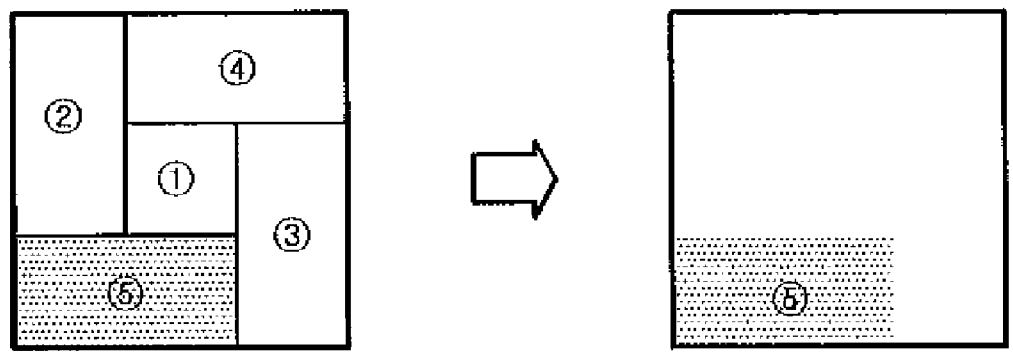
Figure 8F:
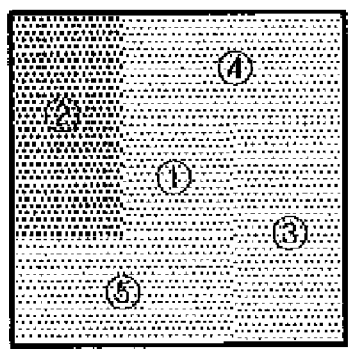

The divided and focused images for respective regions as illustrated in FIGS. 8A to 8E are integrated into one image to form one frame image as illustrated in FIG. 8F.

Focusing for respective regions illustrated in FIGS. 8A to 8E can be sequentially performed using one band pass filter and one buffer, or simultaneously performed using a plurality of band pass filters and a plurality of buffers or a buffer having a plurality of memory regions.

In the division AF apparatus according to the embodiment of FIG. 6, a plurality of band pass filters 66 corresponding to the number of windows per frame may be connected in parallel to filter input image data for each region.

Figure 9:
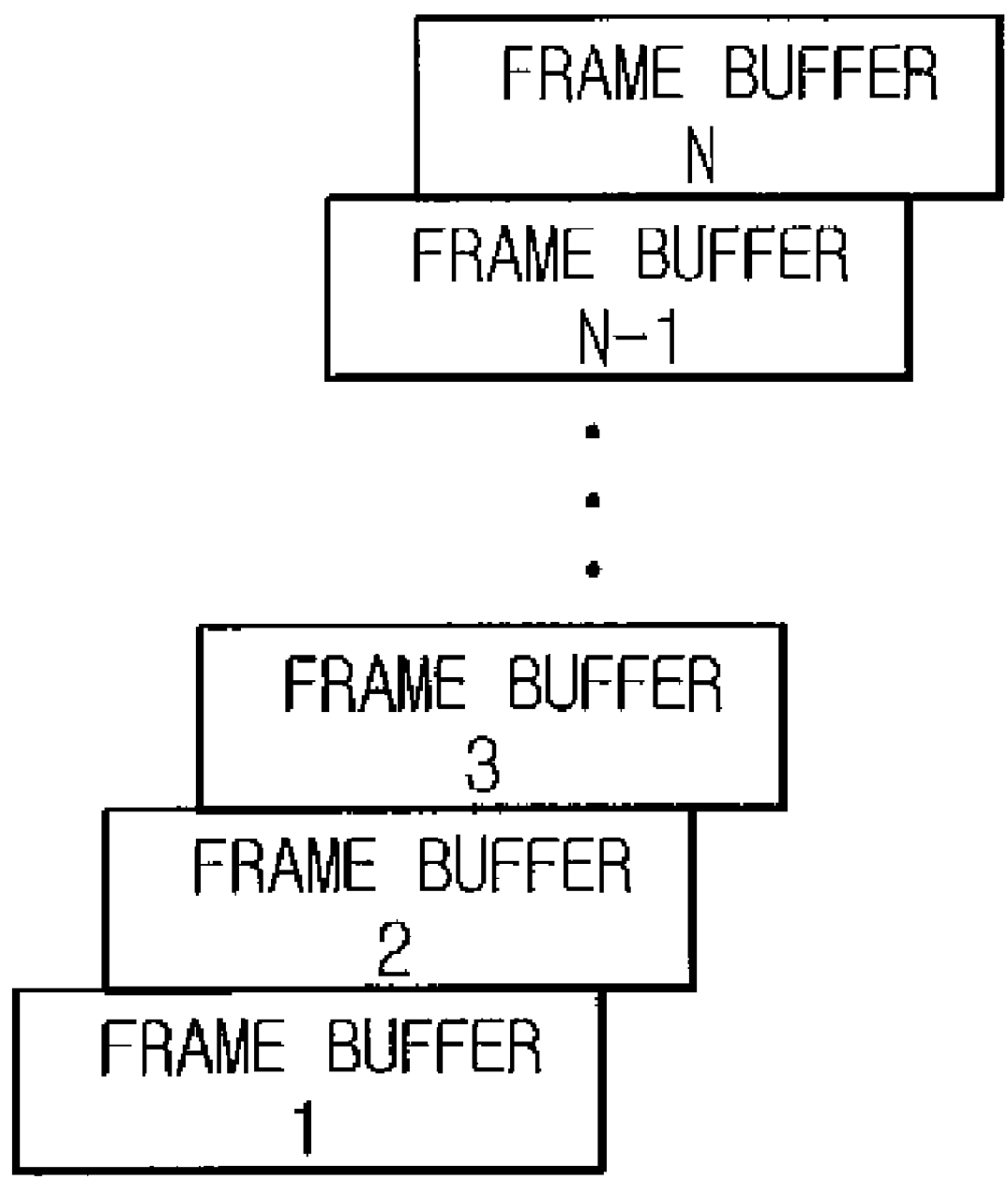
FIG. 9 is a construction of a buffer according to an embodiment.

Also, the buffer 69 may be divided into a plurality of memory regions corresponding to the number of divided windows as illustrated in FIG. 9, or may include a plurality of memories connected in parallel.

In the case where one band pass filter 66 and one buffer 69 are used, much time is consumed because one band pass filter 66 and one buffer 69 should perform a focusing operation process on regions divided into a plurality of windows. On the other hand, in the case where a plurality of band pass filters 66 and the buffer 69 divided into a plurality of memory regions are used, a faster operation can be expected because one frame can be processed by a focusing operation process for one region.

Depending on embodiments, a method of delivering image data from the lens module 61 to only the band pass module 66, and storing a focused image in the buffer 69 can be used, and a method of delivering image data from the lens module 61 to the band pass filter 66 and the buffer 69, simultaneously, storing an image not yet filtered in the buffer 69, and replacing the image not yet filtered with a focused image can be used.

In a focal distance control method using a curvature variable reflective type diffraction device, the focal distance of a lens can be controlled in a faster and more efficient manner.

In a method for correcting a focusing error of a lens using a curvature variable reflective type diffraction device, an error generated during an operation of a camera module can be efficiently corrected.

Also, in a discrete division focusing method and apparatus according to an embodiment, focusing can be performed over an entire image frame uniformly and swiftly.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A discrete automatic focusing method comprising:
    moving a focus to a (the number of all positions/m)-th position;
    comparing a focusing value at a start position with that at the (the number of all positions/m)-th position;
    moving a focus by two positions in a first direction according to the comparison result;
    if a position having a maximum focusing value is passed, moving a focus by one position in a direction opposite to the first direction and storing a location (corresponding to an n-th position); and
    repeating a movement between focus locations of the n-th position, an (n−1)-th position, and an (n−2)-th position, m being an integer equal to or greater than 2.

2. The method according to claim 1, wherein when the focusing value at the (the number of all positions/m)-th position is greater than that at the start position as a result of the comparison of the start position with that of the (the number of all positions/m)-th position, the first direction is a direction along which a focal distance from a lens increases.

3. The method according to claim 1, wherein when the focusing value at the (the number of all positions/m)-th position is less than that at the start position as a result of the comparison of the start position with that of the (the number of all positions/m)-th position, the first direction is a direction along which a focal distance from a lens decreases.

4. The method according to claim 1, wherein m is 2.

* * * * *